Nov. 14, 1933.  H. W. SMITH  1,935,064

MACHINE ELEMENT

Filed May 28, 1929  2 Sheets-Sheet 1

INVENTOR
*Horatio W. Smith*
BY *White, Prost & Fryer*
ATTORNEYS

Nov. 14, 1933.  H. W. SMITH  1,935,064
MACHINE ELEMENT
Filed May 28, 1929  2 Sheets-Sheet 2
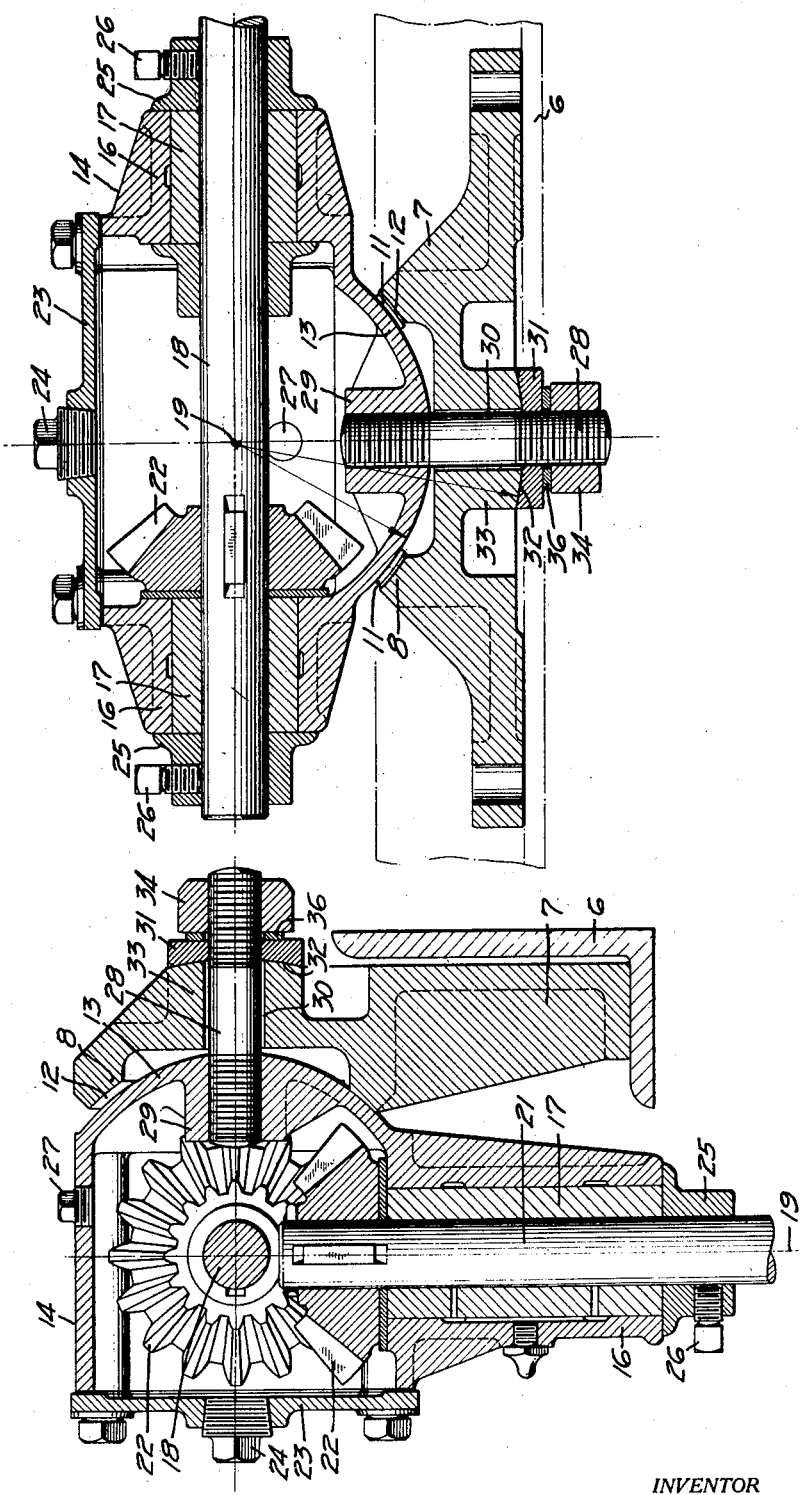
INVENTOR
Horatio W. Smith
BY White, Prost & Fryer
ATTORNEYS Patented Nov. 14, 1933

1,935,064

UNITED STATES PATENT OFFICE 1,935,064

MACHINE ELEMENT

Horatio W. Smith, Stockton, Calif., assignor to Caterpillar Tractor Co., San Leandro, Calif., a corporation of California Application May 28, 1929. Serial No. 366,588

5 Claims. (Cl. 74—101)

My invention relates particularly to mountings for drive gears used on the header units of combined harvesters. Such vehicles are usually of rather flexible construction inasmuch as they are propelled over rough terrain and are subjected to very severe twisting and wracking strains. It is advisable to have power transmitting shafts so mounted that their bearings are free from binding and further that any meshing gears be held relatively rigidly with respect to each other to insure long life and quietness.

It is therefore an object of my invention to provide a gear nest on the header unit of a harvester in such a fashion that the shaft bearings are undisturbed by weaving and flexing of the header frame.

Another object of my invention is to provide a simple mounting for a gear nest which will permit proper alignment.

Another object of my invention is to provide a gear nest which can either be locked in adjusted position or can be permitted to adjust itself to accommodate for flexing of its mounting.

The foregoing and other objects are attained in the embodiment of the invention shown in the drawings, in which Figure 1 is a plan of the gear nest of my invention.

Fig. 4 is a cross section on the line 4—4 of Fig. 1.

Fig. 5 is a cross section on the line 5—5 of Fig. 1.

In its preferred form, the gear nest of my invention preferably comprises a gear housing having a spherical projection adapted to be received on a spherical seat forming part of the base and held thereon for limited universal movement by a stem and retainer.

Figure 1:
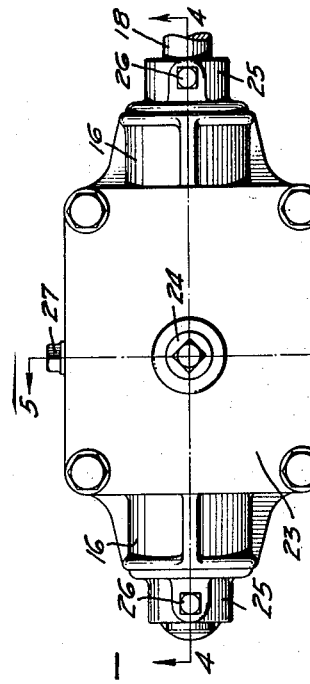
Figure 2:
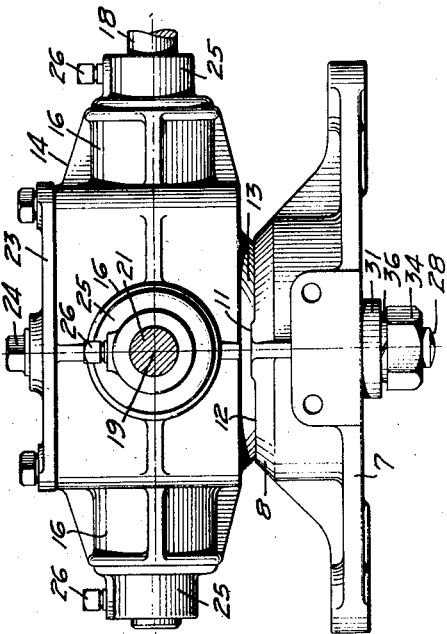
Fig. 2 is a front elevation of the gear nest of my invention.
Figure 3:
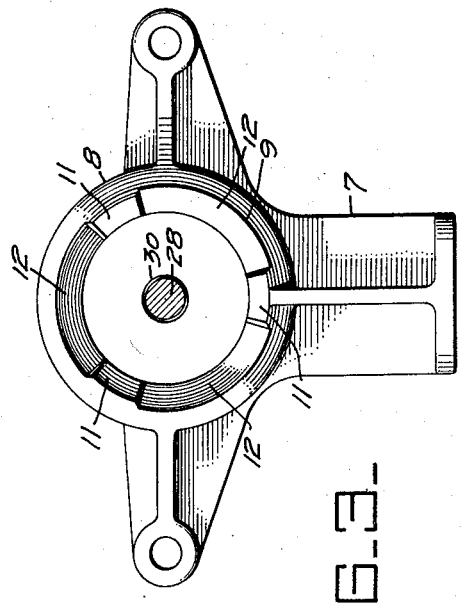
Fig. 3 is a plan of the base of my gear nest.

Although the gear nest of my invention is applicable to a number of different environments, it is particularly useful in conjunction with the header unit of a combined harvester and it is in such environment that I have chosen to describe it herein. The gear nest is usually mounted on the framework 6 of the header by suitable fastenings and includes a base 7, preferably of cast material, which is formed with a spherical seat 8. This seat can take the shape of a relatively narrow annulus 9 having a plurality of spherically surfaced projections 11 thereon with intermediate cutaway or relieved portions 12. As most clearly shown in Fig. 3, the projections 11 are preferably three in number and equi-spaced about the circumference of the circle which seat 8 defines.

Adapted to contact the projections 11 is a spherical projection 13 of a gear housing 14 preferably constructed of cast metal and having a plurality of bearing bosses 16 formed integrally therewith. Each of the bosses is preferably lined with a bushing 17 for the reception of a shaft. In the present instance, a drive shaft 18 is journalled in two aligned bushings 17 and extends through the gear housing. The axis of this shaft is disposed substantially at right angles to and co-planar with the axis 19 of a second shaft 21 journalled in an elongated bushing 17. The shafts carry bevel gears 22 which intermesh for the transmission of power. The location of the shaft axes is preferably such that their intersection is the center of curvature of the spherical projection 13 and of the spherical seat 11 of the base.

The gear casing is preferably sealed by a cover plate 23 having a lubricant filling plug 24 therein and the lubricant is retained and the shafts are held in place by collars 25 rotatably fixed to the various shafts by set screws 26. Additionally, an oil level plug 27 is disposed in one of the side walls of the casing.

With the construction as so far described the gear casing is capable of unlimited universal movement on the base by virtue of the contacting spherical projection and spherical seat so that any movement of the base 7 by reason of the flexure or weaving of the frame 6 is ineffective to throw strains on the shaft bushings 17 or to cause misalignment of the gears 22.

I have found it desirable however, to limit the amount of universal movement between the gear housing and the base and for this reason I provide a stem 28 which is screw threaded into a boss 29 integrally formed with the spherical projection 13. The stem extends axially through an aperture 30 piercing the base 7 at a point substantially central of the spherical seat 8.

The stem 28 is capable of limited universal rotary movement with respect to the base 7 by virtue of the fact that the stem is considerably smaller in diameter than the aperture 30. The amount of relative movement necessary is rather slight but I have found that this limited movement is extremely important in preserving alignment of the shafts and proper meshing of the gears despite considerable flexure of the supporting frame 6.

The stem 28 projects below the base to receive a washer 31, provided with a concave spherical surface 32 abutting a similar and co-operating convex spherical surface formed at the extremity of a boss 33 on the base 7. The surface 32 is concentric with the spherical projection 13; that is, the intersection of the shaft axes is the common center not only for the spherical projection 13 but also for the surface 32.

On stem 28 I preferably provide a retainer which comprises a nut 34 abutting a lock washer 36 bearing against washer 31. If desired the nut 34 can be tightened to secure rigidly the entire gear casing and base assembly together in any predetermined adjusted position. However, under normal conditions of operation I prefer to clamp the assembly together relatively loosely to permit a certain amount of relative movement therebetween to compensate for inaccuracy in mounting or weaving of the support.

By utilizing the gear nest of my invention it is possible to assemble the structure more quickly than is ordinarily the case because no particular care must be exercised to obtain proper alignment, suitable alignment taking place as a matter of course with my structure. Furthermore, whatever movement occurs between the frame 6 and the shafting is automatically compensated for by the spherical mounting of the gear casing so that a relatively light, automatically compensating mechanism is provided which is cheap to manufacture and is economical to install and maintain.

The spaced projections 11 form a tripod support for the curvilinear surfaced projection 13, which automatically permits proper alignment and seating of the gear housing thereon, and, consequently, makes it possible to employ a rough casting as the base 7. Otherwise, it would be necessary to machine accurately the spherical surface of seat 8, (if it were made continuous) in order to allow the curvilinear surface to seat evenly. Since the structure described permits the use of a rough casting, a considerable saving in time and labor costs is effected, which costs would be otherwise entailed if accurate machining of the base were required.

It is to be understood that I do not limit myself to the form of the gear nest shown and described herein, as the invention as set forth in the following claims may be embodied in a plurality of forms.

I claim:

1. A gear nest comprising power driven gearing and shafts connected thereto, the axes of said shafts intersecting and lying in a plane, a gear housing having a spherical projection thereon and enclosing said gearing, a base having a complementary spherical seat thereon, a stem on said projection and passing through an enlarged aperture in said base, the axis of said stem being substantially normal to said plane, a washer on said stem having a spherical surface abutting a complementary spherical surface on said base, and a retainer on said stem.

2. A gear nest comprising power driven gearing and shafts connected thereto, the axes of said shafts intersecting and lying in a plane, a base having concentric concave and convex spherical surfaces thereon, a gear housing enclosing said gearing and having a convex spherical projection seating on said concave surface, a washer having a concave spherical surface seating on said convex surface, a stem on said housing passing loosely through said base and through said washer, the axis of said stem being substantially normal to said plane, and a nut on said stem clamping said housing, said base and said washer together.

3. The combination with two perpendicular shafts interconnected by gearing, of a support therefor, comprising a housing on which the shafts are journaled, a bracket, and means to secure said housing to said bracket for limited universal movement relatively thereto about the intersection of the axes of said shafts as a center, including cooperating pairs of spherical surfaces at different radial distances from said center, said shafts being both movable together upon movement of said housing.

4. The combination with a plurality of shafts interconnected by gearing and having their axes intersecting at a point, of a support therefor, comprising a housing on which the shafts are journaled, a bracket, and means to secure said housing to said bracket for limited universal movement thereto about the intersection of the axes of said shafts as a center, including cooperating pairs of curvilinear surfaces at different radial distances from said center, said shafts being movable together upon movement of said housing.

5. The combination with a plurality of shafts interconnected by gearing and having their axes intersecting at a point, of a support therefor, comprising a housing on which the shafts are journaled, a bracket, and means to secure said housing to said bracket for limited universal movement thereto about the intersection of the axes of said shafts as a center, including cooperating pairs of curvilinear surfaces at different radial distances from said center, said shafts being movable together upon movement of said housing, one pair of said curvilinear surfaces being formed by a plurality of spaced projections on the bracket seating a complementary curvilinear surface on the housing.

HORATIO W. SMITH.